(12) United States Patent
Yang et al.

(10) Patent No.: US 12,066,559 B2
(45) Date of Patent: Aug. 20, 2024

(54) INCREASED POSITIONING RESOLUTION

(71) Applicant: QUALCOMM Incorporated, San Diego, CA (US)

(72) Inventors: Yinghua Yang, San Jose, CA (US); Bo Zheng, Sunnyvale, CA (US); Gengsheng Zhang, Cupertino, CA (US); Ning Luo, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 16/668,063

(22) Filed: Oct. 30, 2019

(65) Prior Publication Data

US 2021/0132180 A1    May 6, 2021

(51) Int. Cl.
  *G01S 5/02*    (2010.01)
  *G01S 5/00*    (2006.01)
  (Continued)

(52) U.S. Cl.
  CPC .......... *G01S 5/0236* (2013.01); *G01S 5/0036* (2013.01); *G01S 5/021* (2013.01); *G01S 19/09* (2013.01);
  (Continued)

(58) Field of Classification Search
  CPC ...... G01S 5/0036; G01S 5/0236; G01S 19/09; G01S 19/258; H04W 4/029; H04W 64/00
  (Continued)

(56) References Cited

U.S. PATENT DOCUMENTS 6,104,338 A * 8/2000 Krasner ................. G01S 19/08
                                                342/357.45
6,975,266 B2 * 12/2005 Abraham ............... G01S 19/09
                                                342/357.59
(Continued)

FOREIGN PATENT DOCUMENTS

WO    WO-2024035465 A1 *  2/2024  ........... G01S 5/0009

OTHER PUBLICATIONS

Moeglein and Krasner. "An Introduction to Snap Track Wireless-Assisted GPS Technology." GPS Solutions, vol. 4, No. 3. pp 16-26. 2001. (Year: 2001).*

(Continued)

*Primary Examiner* — Chuong P Nguyen
(74) *Attorney, Agent, or Firm* — Thien T. Nguyen

(57) ABSTRACT

A method of determining a location of a measurement device includes determining, at a server: measurement times of first positioning signal measurements, of first positioning signals from first positioning signal sources and/or a subset of positioning signal sources of second positioning signal sources. The method includes sending at least one measurement command from the server to the measurement device to cause the measurement device to obtain the first positioning signal measurements in accordance with the measurement times and/or obtain second positioning signal measurements of second positioning signals sent from the subset of positioning signal sources. The method includes: receiving, at the server from the measurement device, measurement data corresponding to the first positioning signal measurements and/or the second positioning signal measurements; and determining, at the server, the location of the measurement device based on the measurement data.

10 Claims, 7 Drawing Sheets

(51) Int. Cl.
  *G01S 19/09* (2010.01)
  *G01S 19/25* (2010.01)
  *H04W 4/029* (2018.01)
  *H04W 64/00* (2009.01)

(52) U.S. Cl.
  CPC .......... *G01S 19/258* (2013.01); *H04W 4/029* (2018.02); *H04W 64/00* (2013.01)

(58) Field of Classification Search
  USPC .............................. 342/451, 357.42, 357.46
  See application file for complete search history.

(56) References Cited

U.S. PATENT DOCUMENTS

| | | | | |
|---|---|---|---|---|
| 8,483,707 | B2* | 7/2013 | Krishnamurthy | G01S 5/0036 |
| | | | | 370/320 |
| 9,554,354 | B2* | 1/2017 | Sheynblat | G01S 5/14 |
| 9,609,539 | B2* | 3/2017 | Edge | G01S 5/02526 |
| 9,986,373 | B2* | 5/2018 | Davydov | G01S 19/05 |
| 10,154,378 | B2* | 12/2018 | Lee | H04W 4/021 |
| 10,154,453 | B2* | 12/2018 | Kumar | H04W 8/183 |
| 10,386,454 | B2* | 8/2019 | Wang | G01S 5/02213 |
| 2004/0257277 | A1* | 12/2004 | Abraham | G01S 19/258 |
| | | | | 342/357.59 |
| 2010/0331009 | A1* | 12/2010 | Krishnamurthy | G01S 5/0036 |
| | | | | 455/456.1 |
| 2015/0119078 | A1* | 4/2015 | Sheynblat | G01S 19/09 |
| | | | | 455/456.1 |
| 2015/0133152 | A1 | 5/2015 | Edge et al. | |
| 2015/0338500 | A1* | 11/2015 | Levin | G01S 19/42 |
| | | | | 455/456.6 |
| 2016/0205499 | A1* | 7/2016 | Davydov | H04W 64/003 |
| | | | | 455/456.1 |
| 2016/0349353 | A1* | 12/2016 | Wang | H04W 4/20 |
| 2017/0150315 | A1* | 5/2017 | Lee | H04W 4/029 |
| 2018/0213350 | A1* | 7/2018 | Pon | G01S 5/0036 |
| 2018/0310237 | A1* | 10/2018 | Kumar | G01S 5/10 |
| 2023/0090412 | A1* | 3/2023 | Rousseau | G01S 19/44 |
| | | | | 342/357.27 |

OTHER PUBLICATIONS

International Search Report and Written Opinion—PCT/US2020/070715—ISA/EPO—May 18, 2021.

* cited by examiner

INCREASED POSITIONING RESOLUTION

BACKGROUND

Devices, both mobile and static, are increasingly equipped to take measurements and to determine their locations from the measurements taken. For example, a measurement device may determine its location based on signals such satellite positioning system (SPS) signals, cellular network signals, and/or Wi-Fi signals, etc. that the device receives. Also or alternatively, the location of a target device may be determined by a location-determining device to which measurements taken by the target device are provided. The types of devices that are capable of taking measurements of signals for positioning and wirelessly communicating the measurements continue to expand, for example with household items, or devices that can be associated with (e.g., attached to or incorporated in) other devices often being capable of taking measurements of signals and wirelessly communicating the measurements.

In order to provide the capability of measuring signals for positioning to more measurement devices, the measurement devices are often lower-capability devices. The lower-capability devices may not be able to determine positions, at least to an acceptable degree of accuracy, of the lower-capability devices due to constraints on the processing capability, available storage, and/or available battery power of the lower-capability devices. For example, Internet of Things (IoT) devices are often installed on or part of fixed structures, i.e., structures that do not move. Memory and power constraints (e.g., due to battery life) may inhibit the ability of an IoT device to provide sufficiently-accurate location information (e.g., an indication of location or information from which location may be determined).

SUMMARY

An example of a method of determining a location of a measurement device includes: determining, at a server: measurement times of first positioning signal measurements, of first positioning signals from a first plurality of positioning signal sources; or a subset of positioning signal sources of a second plurality of positioning signal sources, the subset of positioning signal sources comprising fewer positioning signal sources than the second plurality of positioning signal sources; or a combination thereof; sending at least one measurement command from the server to the measurement device to cause the measurement device to: obtain the first positioning signal measurements in accordance with the measurement times; or obtain second positioning signal measurements of second positioning signals sent from the subset of positioning signal sources; or a combination thereof; receiving, at the server from the measurement device, measurement data corresponding to the first positioning signal measurements, or the second positioning signal measurements, or a combination thereof; and determining, at the server, the location of the measurement device based on the measurement data.

Implementations of such a method may include one or more of the following features. The method includes: determining that the location of the measurement device has been determined within a threshold level of accuracy; and in response to determining that the location of the measurement device has been determined within the threshold level of accuracy, sending a termination command to the measurement device to cause the measurement device to stop obtaining the first positioning signal measurements, or stop obtaining the second positioning signal measurements, or a combination thereof. The method includes storing the measurement data, where determining the location of the measurement device includes batch processing the measurement data corresponding to multiple ones of the first positioning signal measurements, or multiple ones of the second positioning signal measurements, or a combination of at least one of the first positioning signal measurements and at least one of the second positioning signal measurements. The batch processing is performed in response to determining that a threshold amount of the measurement data has been stored. The threshold amount of the measurement data is an amount sufficient for the server to determine the location of the measurement device within a threshold level of accuracy.

Also or alternatively, implementations of such a method may include one or more of the following features. The method includes averaging the measurement data to produce averaged measurement data, where determining the location of the measurement device based on the measurement data includes determining the location of the measurement device using the averaged measurement data. The method includes: receiving relative location information regarding a relative location of the measurement device and another device; determining the relative location of the other device to the measurement device from the relative location information; and determining a location of the other device based on the location of the measurement device and the relative location of the other device to the measurement device. Determining the subset of positioning signal sources includes determining positioning signal sources of the second plurality of positioning signal sources from which high-quality positioning signals will be received at the measurement device.

An example of a server configured to determine a location of a measurement device includes: a transceiver configured to communicate with the measurement device; and a processor communicatively coupled to the transceiver and configured to: determine: measurement times of first positioning signal measurements of first positioning signals from a first plurality of positioning signal sources; or a subset of positioning signal sources of a second plurality of positioning signal sources, the subset of positioning signal sources comprising fewer than the second plurality of positioning signal sources; or a combination thereof; send, via the transceiver, at least one measurement command to the measurement device to cause the measurement device to: obtain the first positioning signal measurements in accordance with the measurement times; or obtain second positioning signal measurements of second positioning signals sent from the subset of positioning signal sources; or a combination thereof; receive, via the transceiver, measurement data from the measurement device corresponding to the first positioning signal measurements, or the second positioning signal measurements, or a combination thereof; and determine the location of the measurement device based on the measurement data.

Implementations of such a server may include one or more of the following features. The processor is configured to: determine that the location of the measurement device has been determined within a threshold level of accuracy; and in response to a determination that the location of the measurement device has been determined within the threshold level of accuracy, send a termination command to the measurement device to cause the measurement device to stop obtaining the first positioning signal measurements, or stop obtaining the second positioning signal measurements, or a combination thereof. The includes a memory, the processor is configured to store the measurement data in the memory, and to determine the location of the measurement device, the processor is configured to batch process the measurement data corresponding to multiple ones of the first positioning signal measurements, or multiple ones of the second positioning signal measurements, or a combination of at least one of the first positioning signal measurements and at least one of the second positioning signal measurements. The processor is configured to batch process the measurement data in response to a determination that a threshold amount of the measurement data has been stored. The threshold amount of the measurement data is an amount sufficient for the processor to determine the location of the measurement device within a threshold level of accuracy.

Also or alternatively, implementations of such a server may include one or more of the following features. The processor is configured to average the measurement data to produce averaged measurement data, and the processor is configured to determine the location of the measurement device using the averaged measurement data. The processor is configured to: receive, via the transceiver, relative location information from the measurement device regarding a relative location of the measurement device and another device; determine the relative location of the other device to the measurement device from the relative location information; and determine a location of the other device based on the location of the measurement device and the relative location of the other device to the measurement device. The processor is configured to determine the subset of positioning signal sources as positioning signal sources of the second plurality of positioning signal sources from which high-quality positioning signals will be received at the measurement device.

Another example of a server configured to determine a location of a measurement device includes: first determining means for determining: measurement times of first positioning signal measurements, of first positioning signals from a first plurality of positioning signal sources; or a subset of positioning signal sources, of a second plurality of positioning signal sources, the subset of positioning signal sources comprising fewer positioning signal sources than the second plurality of positioning signal sources; or a combination thereof; sending means, communicatively coupled to the first determining means, for sending at least one measurement command to the measurement device to cause the measurement device to: obtain the first positioning signal measurements in accordance with the measurement times; or obtain second positioning signal measurements of second positioning signals sent from the subset of positioning signal sources; or a combination thereof; receiving means for receiving, from the measurement device, measurement data corresponding to the first positioning signal measurements, or the second positioning signal measurements, or a combination thereof; and second determining means, communicatively coupled to the receiving means, for determining the location of the measurement device based on the measurement data.

Implementations of such a server may include one or more of the following features. The second determining means include means for determining that the location of the measurement device has been determined within a threshold level of accuracy, and means for responding to the location of the measurement device being determined within the threshold level of accuracy by sending a termination command to the measurement device to cause the measurement device to stop obtaining the first positioning signal measurements, or stop obtaining the second positioning signal measurements, or a combination thereof. The server includes means for storing the measurement data, and the second determining means include batch means for batch processing the measurement data corresponding to multiple ones of the first positioning signal measurements, or multiple ones of the second positioning signal measurements, or a combination of at least one of the first positioning signal measurements and at least one of the second positioning signal measurements. The batch means are configured to batch process the measurement data in response to a threshold amount of the measurement data being stored by the means for storing the measurement data. The threshold amount of the measurement data is an amount sufficient for the second determining means to determine the location of the measurement device within a threshold level of accuracy.

Also or alternatively, implementations of such a server may include one or more of the following features. The server includes means for averaging the measurement data to produce averaged measurement data, and the second determining means are for determining the location of the measurement device based on the measurement data comprises determining the location of the measurement device using the averaged measurement data. The server includes: means for receiving relative location information regarding a relative location of the measurement device and another device; means for determining the relative location of the other device to the measurement device from the relative location information; and means for determining a location of the other device based on the location of the measurement device and the relative location of the other device to the measurement device. The first determining means include means for determining the subset of positioning signal sources as positioning signal sources of the second plurality of positioning signal sources from which high-quality positioning signals will be received at the measurement device.

An example non-transitory, processor-readable storage medium includes processor-readable instructions stored thereon configured to cause a processor to: determine: measurement times of first positioning signal measurements of first positioning signals from a first plurality of positioning signal sources; or a subset of positioning signal sources, of a second plurality of positioning signal sources, the subset of positioning signal sources comprising fewer than the second plurality of positioning signal sources; or a combination thereof; send, via a transceiver, at least one measurement command to a measurement device to cause the measurement device to: obtain the first positioning signal measurements in accordance with the measurement times; or obtain second positioning signal measurements of second positioning signals sent from the subset of positioning signal sources; or a combination thereof; receive, via the transceiver from the measurement device, measurement data corresponding to the first positioning signal measurements, or the second positioning signal measurements, or a combination thereof; and determine a location of the measurement device based on the measurement data.

Implementations of such a storage medium may include one or more of the following features. The storage medium includes instructions configured to cause the processor to: determine that the location of the measurement device has been determined within a threshold level of accuracy; and in response to the location of the measurement device being determined within the threshold level of accuracy, send a termination command to the measurement device to cause the measurement device to stop obtaining the first positioning signal measurements, or stop obtaining the second positioning signal measurements, or a combination thereof. The storage medium includes instructions configured to cause the processor to store the measurement data in memory, where the instructions configured to cause the processor to determine the location of the measurement device are configured to cause the processor to batch process the measurement data corresponding to multiple ones of the first positioning signal measurements, or multiple ones of the second positioning signal measurements, or a combination of at least one of the first positioning signal measurements and at least one of the second positioning signal measurements. The instructions configured to cause the processor to batch process the measurement data are configured to cause the processor to batch process the measurement data in response to a threshold amount of the measurement data being stored by the processor. The threshold amount of the measurement data is an amount sufficient for the processor to determine the location of the measurement device within a threshold level of accuracy.

Also or alternatively, implementations of such a storage medium may include one or more of the following features. The storage medium includes instructions configured to cause the processor to average the measurement data to produce averaged measurement data, and the instructions configured to cause the processor to determine the location of the measurement device are configured to cause the processor to determine the location of the measurement device using the averaged measurement data. The storage medium includes instructions configured to cause the processor to: receive, via the transceiver from the measurement device, relative location information regarding a relative location of the measurement device and another device; determine the relative location of the other device to the measurement device from the relative location information; and determine a location of the other device based on the location of the measurement device and the relative location of the other device to the measurement device. The instructions configured to cause the processor to determine the subset of positioning signal sources are configured to cause the processor to determine the subset of positioning signal sources as positioning signal sources of the second plurality of positioning signal sources from which high-quality positioning signals will be received at the measurement device.

An example method of obtaining and providing positioning signal information includes: receiving, at a measurement device, at least one measurement command from a server, the at least one measurement command indicating: measurement times of first positioning signal measurements of first positioning signals from a first plurality of positioning signal sources; or a subset of positioning signal sources of a second plurality of positioning signal sources, the subset of positioning signal sources comprising fewer than the second plurality of positioning signal sources; or a combination thereof, in response to the at least one measurement command, at the measurement device: obtaining the first positioning signal measurements in accordance with the measurement times; or obtaining second positioning signal measurements of second positioning signals sent from the subset of positioning signal sources; or a combination thereof; and sending, from the measurement device to the server, measurement data corresponding to the first positioning signal measurements, or the second positioning signal measurements, or a combination thereof.

Implementations of such a method may include one or more of the following features. The method includes: obtaining a third positioning signal measurement, at the measurement device, of a third positioning signal from another device; determining relative location information regarding a relative location of the measurement device and the other device based on the third positioning signal measurement; and sending the relative location information to the server from the measurement device. The method includes storing a threshold amount of the measurement data at the measurement device, and sending the measurement data is performed in response to the threshold amount of the measurement data being stored at the measurement device. The threshold amount of the measurement data is an amount sufficient for the server to determine a location of the measurement device within a threshold level of accuracy. The method includes averaging the measurement data to produce averaged measurement data, and sending the measurement data from the measurement device to the server comprises sending the averaged measurement data.

An example measurement device includes: a receiver configured to receive positioning signals; a transceiver; and a processor communicatively coupled to the receiver and the transceiver and configured to: receive, via the transceiver, at least one measurement command indicating: measurement times of first positioning signal measurements of first positioning signals from a first plurality of positioning signal sources; or a subset of positioning signal sources, of a second plurality of positioning signal sources, the subset of positioning signal sources comprising fewer than the second plurality of positioning signal sources; or a combination thereof; respond to the at least one measurement command to use the receiver to: obtain first positioning signal measurements in accordance with the measurement times; or obtain second positioning signal measurements of second positioning signals sent from the subset of positioning signal sources; or a combination thereof, and send, via the transceiver, measurement data corresponding to the first positioning signal measurements, or the second positioning signal measurements, or a combination thereof.

Implementations of such a device may include one or more of the following features. The processor is configured to: determine relative location information regarding a relative location of the measurement device and another device from a third positioning signal measurement of a third positioning signal received from the other device; and send, via the transceiver, the relative location information. The processor is configured to store a threshold amount of the measurement data at the measurement device, and the processor is configured to send the measurement data in response to the threshold amount of the measurement data being stored at the measurement device. The threshold amount of the measurement data is an amount sufficient to determine the location of the measurement device within a threshold level of accuracy. The processor is configured to average the measurement data to produce averaged measurement data, and to send the measurement data from the measurement device, the processor is configured to send the averaged measurement data.

An example of a measurement device includes: means for receiving at least one measurement command from a server, the at least one measurement command indicating: measurement times of first positioning signal measurements of first positioning signals from a first plurality of positioning signal sources; or a subset of positioning signal sources, of a second plurality of positioning signal sources, the subset of positioning signal sources comprising fewer than the second plurality of positioning signal sources; or a combination thereof; means for responding to the at least one measurement command by: obtaining first positioning signal measurements in accordance with the measurement times; or obtaining second positioning signal measurements of second positioning signals sent from the subset of positioning signal sources; or a combination thereof; and means for sending, to the server, measurement data corresponding to the first positioning signal measurements, or the second positioning signal measurements, or a combination thereof.

Implementations of such a device may include one or more of the following features. The measurement device includes: means for obtaining a third positioning signal measurement of a third positioning signal from another measurement device; means for determining relative location information regarding a relative location of the measurement device and the other measurement device based on the third positioning signal measurement; and means for sending the relative location information to the server. The measurement device includes means for storing a threshold amount of the measurement data at the measurement device, where the means for sending the measurement data are configured to send the measurement data in response to the threshold amount of the measurement data being stored at the measurement device. The threshold amount of the measurement data is an amount sufficient for the server to determine the location of the measurement device within a threshold level of accuracy. The measurement device includes means for averaging the measurement data to produce averaged measurement data, where the means for sending the measurement data to the server are configured to send the averaged measurement data.

Another example of a non-transitory, processor-readable storage medium includes processor-readable instructions stored thereon configured to cause a processor of a measurement device to: receive, via a transceiver from a server, at least one measurement command indicating: measurement times of first positioning signal measurements of first positioning signals from a first plurality of positioning signal sources; or a subset of positioning signal sources, of a second plurality of positioning signal sources, the subset of positioning signal sources comprising fewer than the second plurality of positioning signal sources; or a combination thereof; respond to the at least one measurement command to: obtain first positioning signal measurements in accordance with the measurement times; or obtain second positioning signal measurements from the subset of positioning signal sources; or a combination thereof; and send, via the transceiver to the server, measurement data corresponding to the first positioning signal measurements, or the second positioning signal measurements, or a combination thereof.

Implementations of such a storage medium may include one or more of the following features. The storage medium includes instructions configured to cause the processor to: determine relative location information regarding a relative location of the measurement device and another other measurement device from a third positioning signal measurement of a third positioning signal received from the other measurement device; and send, via the transceiver to the server, the relative location information. The storage medium includes instructions configured to cause the processor to store a threshold amount of the measurement data at the measurement device, where the instructions configured to cause the processor to send the measurement data are configured to cause the processor to send the measurement data in response to the threshold amount of the measurement data being stored at the measurement device. The threshold amount of the measurement data is an amount sufficient for the server to determine a location of the measurement device within a threshold level of accuracy. The storage medium includes instructions configured to cause the processor to average the measurement data to produce averaged measurement data, where the instructions configured to cause the processor to send the measurement data are configured to cause the processor to send the averaged measurement data.

DETAILED DESCRIPTION

Figure 1:
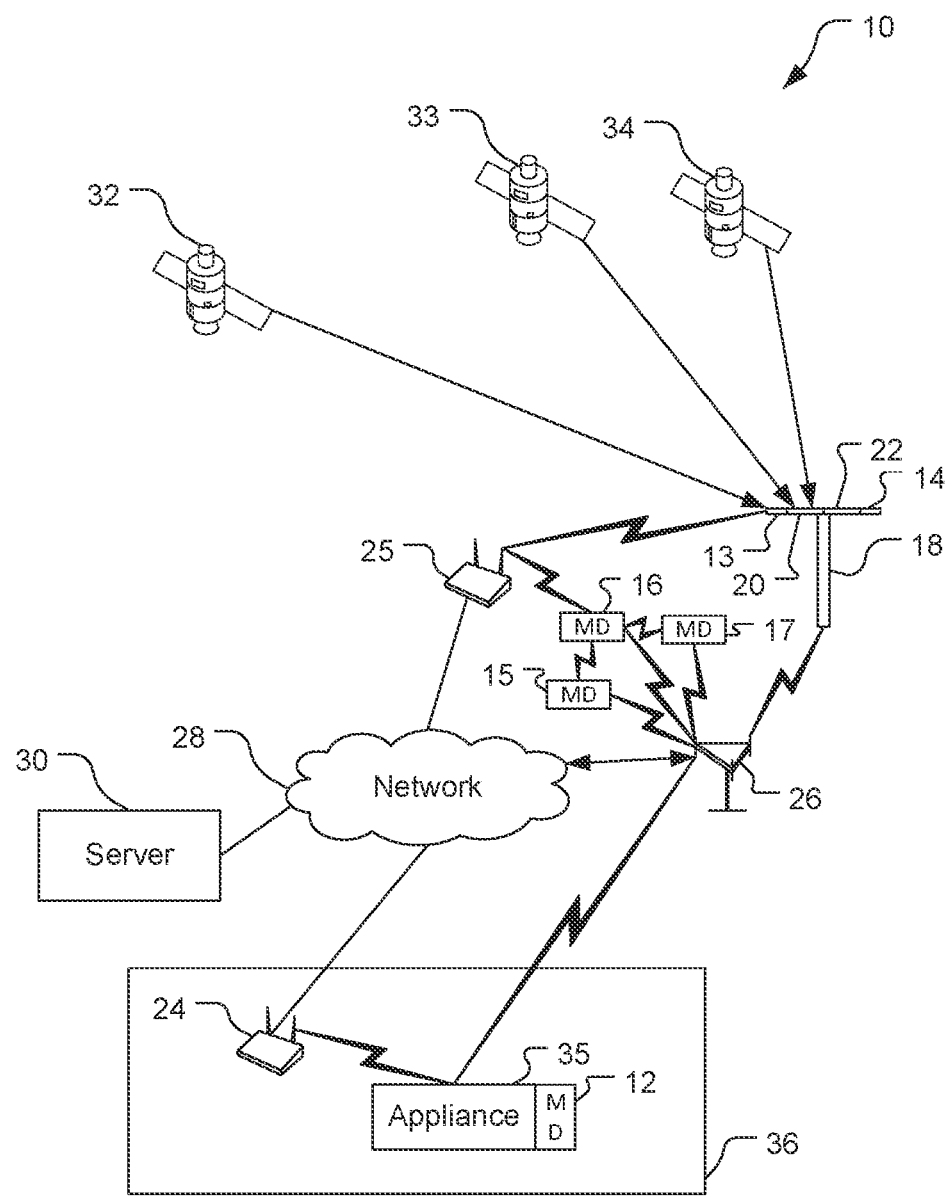
FIG. 1 is a simplified view of a position determination system.

Techniques are discussed herein for determining a location of a positioning signal measurement device. A measurement device can measure signals from which a position of the measurement device may be determined, although the measurement device may be capable of functions other than measuring positioning signals. A measurement device, such as an Internet of Things (IoT) device, may be able to measure positioning signals such as Satellite Positioning System (SPS) signals, or base station signals (e.g., positioning reference signals (PRS), cellular communication signals, Wi-Fi signals, BLUETOOTH® signals, etc.). The measurement device sends measurements to a server. The term measurements is used herein interchangeably with indications of the measurements or values of the measurements. The measurement device may collect multiple measurements and batch report the measurements. The measurement device may combine, e.g., average, two or more measurements and report a combined, e.g., an averaged, measurement value. The server collects the measurement(s) and processes the measurement(s) to determine a location of the measurement device. The server may collect many measurements and batch process the measurements to save power determining the location of the measurement device. The server may combine measurements, e.g., average the measurements, and may combine more measurements than the measurement device could due to power, memory, and/or processing constraints of the measurement device. The server may apply more precise position determination techniques and information than the measurement device could to determine the location of the measurement device. The server may provide one or more commands to the measurement device to affect operation of the measurement device. For example, the server may send one or more commands to the measurement device to cause the measurement device to measure positioning signals at specific times (i.e., to control timing of measurements of the positioning signals). As another example, the server may cause the measurement device to measure positioning signals from a subset of available sources of positioning signals. For example, the server may use an approximate location of the measurement device and knowledge of an environment of that location to determine expected quality of received positioning signals (e.g., which sources have line of sight and which sources have no line of sight, e.g, are blocked) to instruct the measurement device which positioning signals to measure (which sources to track). The measurement device may respond to a measurement command from the server by measuring positioning signals at (only) designated times or from (only) a subset of designated positioning signal sources from a larger set of positioning signal sources. These examples, however, are not exhaustive.

Items and/or techniques described herein may provide one or more of the following capabilities, as well as other capabilities not mentioned. Location of lower-capability devices may be determined with greater accuracy. Location of lower-capability devices may be determined with greater accuracy without altering existing lower-capability devices. Low-cost, low-power-consumption devices may be located with a high degree of accuracy. Deployment cost (e.g., cost of positioning signal measurement devices) and/or operation cost (e.g., power consumption) of a location determination system may be low. Measurement of positioning signals by lower-capability devices may be performed intermittently. Intermittent positioning signal measurements may be stored and collectively reported and/or processed to determine location of a measurement device. More accurate location may be determined compared to commercial-grade satellite positioning system devices. Positioning signals may be measured by lower-capability devices using less power than existing devices. Filtering and/or smoothing may be applied to positioning signal measurements for location determination. Other capabilities may be provided and not every implementation according to the disclosure must provide any, let alone all, of the capabilities discussed.

Referring to FIG. 1, a position determination system 10 includes measurement devices 12, 13, 14, 15, 16, 17, a lamp post 18, light bulbs 20, 22, access points 24, 25, a base station 26, a network 28, a server 30, satellites 32, 33, 34, and an appliance 35. The measurement devices 12-17 are configured to measure positioning signals (signals that may be used to determine position) from positioning signal sources and to report measurements of the positioning signals. The measurement devices 12-17 may be separate from associated devices (e.g., the appliance 35 and the light bulbs 20, 22, as shown) or may be integrated into (integral with) the associated devices. The measurement device 12, the appliance 35, and the access point 24 are disposed inside a structure 36 (e.g., a building). The system 10 is a communication system in that components of the system 10 can communicate with one another directly or indirectly, e.g., via the network 28 and/or the access points 24, 25 and/or the base station 26 (or other access points and/or other bases stations not shown). The system 10 is a wireless communication system in that at least some of the components of the system 10 can communicate with one another wirelessly (i.e., be wireless communication devices). For example, as shown, wireless communication may occur between the access point 24 and the appliance 35, the base station 26 and the appliance 35, the appliance 35 and the base station 26, the measurement device 16 and the access point 25, the measurement devices 13-17 and the base station 26, the measurement devices 13, 14 and the access point 25, and/or between the measurement devices 15-17. Also or alternatively, other wireless communications not shown may occur (e.g., between the measurement device 12 and one or more of the other measurement devices 13-17, and/or between the measurement devices 15, 17 and the access point 25, etc.). Wireless communication may be accomplished using signals according to one or more protocols such as Long Term Evolution (LTE), Global System for Mobile Communications (GSM), Code Division Multiple Access (CDMA), Orthogonal Frequency Division Multiplexing (OFDM), 5G New Radio (NR). The term "wireless communication device" does not require that the functionality of the device be exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication. The two access points 24, 25 and the single base station 26 are examples only, and other quantities of access points and/or base stations may be used. Also, the types of the devices (e.g., an appliance, and light bulbs, with devices associated with the measurement devices 15-17 not shown)) associated with the measurement devices 12-17 are examples and other types of devices may be used, whether currently existing or developed in the future. The lamp post 18 is also an example, and one or more other structures may be used to help keep the light bulbs 20, 22 stationary. Alternatively, no extra structure at all may be associated with a device to help keep the device stationary, with the device itself configured to maintain stationary status. The term "base station" does not limit the base station 26 to any particular form, protocol, etc. For example, the base station 26 (and/or other base stations not shown) may be referred to as a base transceiver station (BTS), an access node (AN), a Node B, an evolved Node B (eNB), etc.

The system 10 is configured such that the measurement devices 12-17 comprise Internet of Things (IoT) devices in this example, with the devices 12-17 configured to measure positioning signals and to communicate measurements of the positioning signals to the server 30 via the access points 24, 25 and/or the base station 26. The system 10 being an IoT network is, however, an example and not required, and one or more of the measurement devices may be a device other than an IoT device. The measurement devices 12-17 may be configured to communicate with each other, particularly through one or more short-range wireless communication techniques in accordance with one or more corresponding short-range wireless communication protocols. Examples of short-range wireless communication techniques include BLUETOOTH® communications, BLUETOOTH® Low-Energy communications, Wi-Fi communications, and LTE Direct communications, etc. The devices 12-17 may send (e.g., broadcast, unicast, multicast) information, and/or may relay information from one of the devices 12-17 to another of the devices 12-17 or to another device such as the access points 24, 25 and/or the base station 26. One or more of the devices 12-17 may include multiple types of radios, e.g., a BLUETOOTH® radio, a Wi-Fi radio, a cellular radio (e.g., LTE, CDMA, 3G, 4G, 5G NR, etc.), etc. such that information may be received using one radio and transmitted using a different radio. Further, one or more of the devices 12-17 may be configured to determine range to another of the devices 12-17, and/or to the access points 24, 25, and/or to the base station 26, and/or to any of the satellites 32-34 (e.g., using round-trip time (RTT), or observed time difference of arrival (OTDOA), or received signal strength indications (RSSI), or a pseudorange based on timing of signal receipt, or one or more other techniques, or a combination of one or more of any of these techniques). One or more of the devices 12-17 may be configured to determine angle of arrival (AOA) of a signal from another of the devices 12-17 and/or from one or more other devices such as the access points 24, 25 and/or the base station 26.

The measurement devices 12-17 are configured to measure positioning signals and to report measurements of the positioning signals. A positioning signal is a signal that may be used to determine position, e.g., may be used to determine relative position (such as range or range and direction) from a source to a recipient of the positioning signal. Positioning signals may be signals dedicated for use in position determination (e.g., SPS signals, PRS signals (positioning reference signals), etc.), or may be signals with one or more other purposes, such as communication signals (e.g., WiFi, BLUETOOTH®, LTE, 5G New Radio (NR), etc.). Positioning signal sources may be dedicated for providing positioning signals, or may be configured to provide one or more other functions instead of or in addition to providing positioning signals. Each instance of a code in a continuous transmission from a positioning signal source may be considered a separate positioning signal. The positioning signals may be measured to allow determination of the position of the measurement device 12-17 relative to the positioning signal source, which may be another of the measurement devices 12-17. The measurement devices 12-17 may be configured to determine the position of the measurement device 12-17 relative to one or more of the other measurement devices 12-17. The positioning signals may be SPS signals received from the satellites 32-34, or communication signals or other signals received from the base station 26 and/or the access points 24, 25 (or other device). The positioning signals may be specifically for use in determining position, e.g., SPS signals or PRS signals, or may have one or more other purposes, e.g., conveying information such as communication information. The devices 12-17 may communicate measurements of the positioning signals to the server 30 using one or more transmission devices, e.g., as discussed further below.

Figure 2:
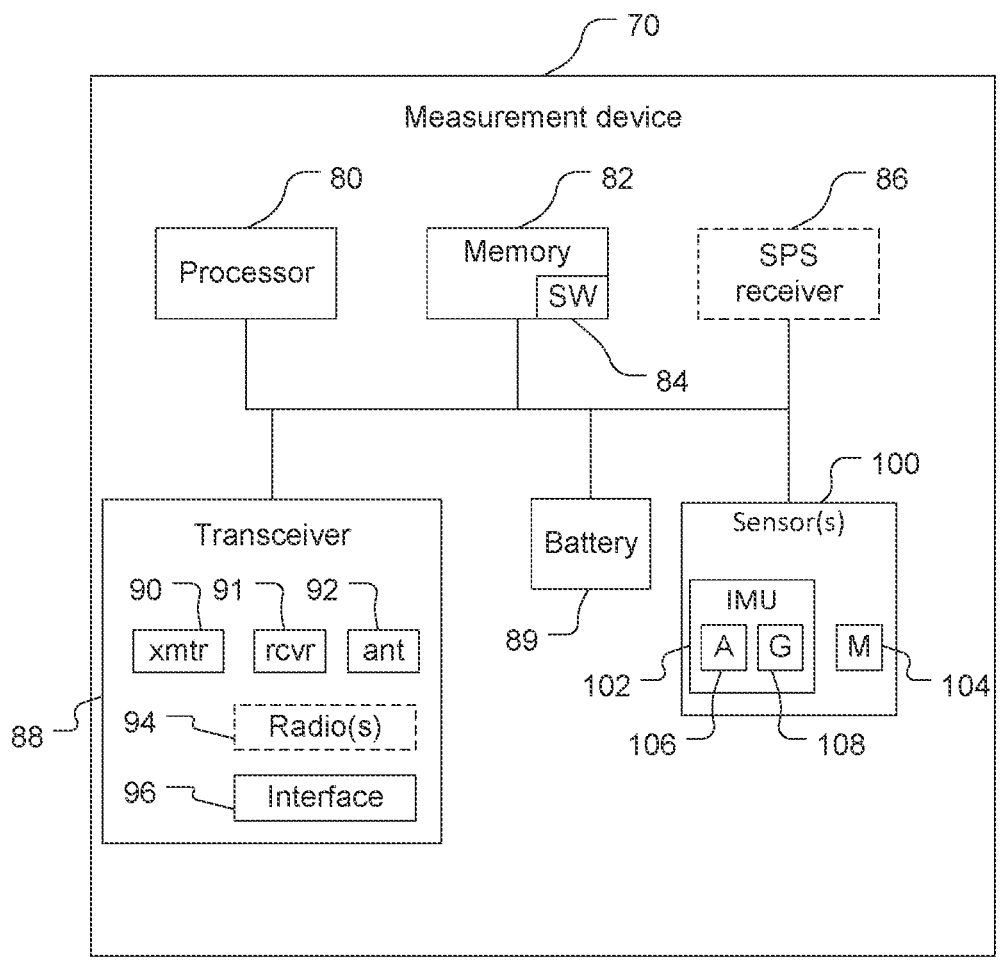
FIG. 2 is a simplified block diagram of a positioning signal measurement device of the position determination system shown in FIG. 1.

Referring to FIG. 2, with further reference to FIG. 1, an example measurement device 70 comprises a computer system including one or more processors 80, one or more memory 82 including software (SW) 84, an optional SPS receiver 86, a transceiver 88, a battery 89, and one or more sensors 100. The sensor(s) 100 may include an inertial measurement unit (IMU) 102 and/or may include a magnetometer 104. The processor 80 may be an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 80 may comprise multiple separate physical entities that can be distributed in the device 70. The memory 82 may include random access memory (RAM) and/or read-only memory (ROM). The memory 82 is a non-transitory, processor-readable storage medium that stores the software 84 which is processor-readable, processor-executable software code containing instructions that are configured to, when performed, cause the processor 80 to perform various functions described herein. The description may refer only to the processor 80 or the device 70 (or one or more of the devices 12-17) performing the functions, but this includes other implementations such as where the processor 80 executes software and/or firmware. The software 84 may not be directly executable by the processor 80 and instead may be configured to, for example when compiled and executed, cause the processor 80 to perform the functions. Whether needing compiling or not, the software 84 contains the instructions to cause the processor 80 to perform the functions. The processor 80 is communicatively coupled to the memory 82. The processor 80 in combination with the memory 82, the SPS receiver 86, and/or the transceiver 88 may provide means for performing functions as described herein, for example, means for receiving measurement commands, means for making measurements of positioning signals, means for sending measurement data, means for receiving location information, and/or means for determining location. The software 84 can be loaded onto the memory 82 by being downloaded via a network connection, uploaded from a disk, etc. The battery 89 stores energy and is coupled and configured to provide power to the other components of the device 70 to enable the other components to perform the functions that the components are configured to perform. The device 70 may be any of the measurement devices 12-17 shown in FIG. 1, or another device.

The measurement devices 12-17 may be lower-capability devices in that the devices 12-17 have limited memory, processing capability, and/or power capacity. The measurement devices 12-17 may lack sufficient memory and/or processing capability and/or power capacity to enable the measurement device 12-17 to determine a position of the measurement device 12-17 to within an acceptable threshold accuracy, e.g., within 1 m. While many applications would benefit from, or even require, position accuracy within 1 m, a high-precision SPS receiver may be too expensive and/or may consume too much power to be used in many IoT devices or other measurement devices. Low expense, low power consumption, and high position accuracy, however, may be desired for many applications. Any of the measurement devices 12-17 may be configured to determine location of the measurement device 12-17, e.g., relative to one or more positioning signal sources, and even a global location, e.g., based on relative location with respect to multiple positioning signal sources.

The SPS receiver 86 is configured to receive and acquire SPS signals from the satellites 32-34. The SPS receiver 86 includes one or more antennas for receiving SPS signals from the satellites 32-34 (or other satellites). The SPS receiver 86 may, either alone or in conjunction with the processor 80, determine a timing of receipt of the SPS signals from the respective satellites 32-34, e.g., by correlating gold codes of various timing offsets with incoming signals. Only three satellites are shown in FIG. 1, but other quantities of satellites may be used, e.g., four or more. The processor 80 may be configured to control operation of the SPS receiver 86, e.g., in accordance with one or more measurement commands received from the server 30 via the transceiver 88. For example, the processor 80 may be configured to respond to a measurement command to control the SPS receiver 86 to search for signals of only a subset of (i.e., less than all) available positioning signal sources (for the SPS receiver 86, satellites), e.g., in response to a command received by the transceiver 88, e.g., from the server 30. For example, the SPS receiver 86 may only correlate gold codes of specific satellites with incoming SPS signals. As another example, the processor 80 may be configured to respond to a measurement command to control the SPS receiver 86 to measure one or more the SPS signals intermittently. For example, the processor 80 may control the SPS receiver 86 to wake up periodically (e.g., upon expiry of a timer, thus at a regular time interval) and measure one or more SPS signals, and to sleep between measurements. The interval between wake-up times may be different for different satellites. The interval may be fixed or variable. The interval may be set by an external device such as the server 30 and sent to the device 70 in the form of a command signal. As another example, the SPS receiver 86 may measure one or more of the SPS signals in response to a wake-up/measure command, e.g., received from the server 30. The wake-up/measure command may indicate to measure all SPS signals, or to measure one or more specific SPS signals (i.e., from one or more specific satellites). The processor 80 may control the SPS receiver 86 (or other receiver) in accordance with a combination of the above, e.g., to measure signals from a subset of positioning signal sources intermittently.

While the discussion above focused on the SPS receiver 86 as a positioning signal receiver or sensor and satellites as positioning signal sources, other positioning signal sources and other receivers or sensors may be used. For example, a wireless communication radio (or other receiver), e.g., of the transceiver 88, may be used as a positioning signal receiver or sensor to receive or measure communication signals.

The processor 80 may be configured to process positioning signals received and to control measurement of positioning signals by the SPS receiver 86, the transceiver 88, or other device. For example, the processor 80 may determine information (e.g., received signal power (e.g., a received signal strength indicator (RSSI)) from which a range (e.g., a pseudorange) to the positioning signal source may be determined. As another example, the processor 80 may be configured to cause the SPS receiver 86 (or other receiver) to cease measuring one or more SPS signals (or one or more other positioning signals) in response to an END command, e.g., received from the server 30, indicating to terminate measurement of one or more of the SPS signals. The END command may indicate to stop measuring all positioning (e.g., SPS) signals, or to stop measuring one or more specific positioning (e.g., SPS) signals (i.e., from one or more specific satellites).

The SPS receiver 86 may be configured to report measurements of the SPS signals. For example, the SPS receiver 86 may be configured to report the timing of the received SPS signals, e.g., to the server 30, and/or (either alone or in conjunction with the processor 80) to calculate pseudoranges to the satellites based on the timing information determined for the SPS signals and to report the pseudoranges. Also or alternatively, the SPS receiver 86 may determine Doppler shift and/or carrier phase as measurements of the SPS signals. The measurements may be reported to the server 30 by sending the measurements from the SPS receiver 86 or the processor 80 via the transceiver 88.

The transceiver 88 includes a transmitter 90, a receiver 91, and an antenna 92. While the transmitter 90, the receiver 91, and the antenna 92 are each referred to in the singular, the transmitter 90 may include multiple transmitters, the receiver 91 may include multiple receivers, and/or the antenna 92 may include multiple antennas. A single receiver may be used to receive positioning signals and communication signals, and/or different receivers may be used to receive positioning signals and communication signals. The antenna 92 may be configured to transduce electrical signals and/or optical signals to wireless signals and to transduce wireless signals to electrical signals and/or optical signals. The transmitter 90 may include one or more appropriate antennas of the antenna 92 and the receiver 91 may include one or more appropriate antennas of the antenna 92.

The transceiver 88 may be configured to send communications via wire or wirelessly from the device 70 and to receive wired or wireless communications into the device 70, e.g., from other ones of the measurement devices 12-17, the access points 24, 25, or the base station 26. The transceiver 88 may include an interface 96 for transmitting and receiving wired communications and may include one or more wireless communication radios 94. For example, the radio(s) 94 may include a BLUETOOTH® radio, a Wi-Fi radio, one or more cellular radios (e.g., a long-term evolution (LTE) radio, a 5G New Radio (NR) radio, etc.), a WWAN (Wireless Wide Area Network) radio, etc. As shown, the radio(s) 94 are optional, although the transceiver 88 will typically include at least one wireless communication radio. One or more other types of radios may be included in the device 70 in addition to, or instead of, the radio(s) 94. The radio(s) 94 and/or other radio(s) included in the transceiver 88 include appropriate portions of the transmitter 90, the receiver 91, and the antenna 92. If the transceiver 88 includes more than one wireless communication radio, then the transceiver 88 may receive a wireless communication using one of the wireless communication radios, and transmit (e.g., relay or forward), the communication (or a portion thereof) using a different wireless communication radio. The communication may be transmitted to another of the measurement devices 12-17 or to another device such as the access point(s) 24, 25. Thus, for example, the device 70 may receive a wireless communication using a BLUETOOTH® radio of the radio(s) 94, and forward the communication using a Wi-Fi radio of the radio(s) 94 to another device that does not include a BLUETOOTH® radio. One or more wireless communication signals may be used as a positioning signal or positioning signals.

The processor 80 may be configured to send various information to the server 30 via the transceiver 88. For example, the processor 80 may send a location identity, a measurement device identity, SPS time and/or UTC time (Coordinated Universal Time), an SPS measurement block (e.g., positioning signal measurements), customer data, etc. The location identity may identify a civic location (e.g., an address, a building name) or a custom location name (e.g., an identity of the lamp post 18). The measurement device identity may be useful to distinguish between multiple measurement devices associated with the same location identity. Customer data may provide a variety of information such as one or more indications of type and/or status of an item associated with the measurement device 12-17 such as the light bulbs 20, 22, or the appliance 35.

The processor 80 may be configured to store and transmit positioning signal measurements to the server 30 via the transceiver 88. For example, the processor 80 may store and transmit measurements of communication signals from other measurement devices 12-17 to the server 30 and/or to other measurement devices 12-17, and/or may store and transmit positioning signals from the SPS receiver 86 to the server 30. The processor 80 can receive measurements from the SPS receiver 86 and store the measurements in the memory 82, thus buffering the measurements. The processor 80 may be configured to batch report the measurements by batch transmitting multiple measurements from the memory 82 to the server 30. The processor 80 may be configured to compress the measurements before sending the measurements to the server 30. The processor 80 may be able to compress the measurements more if the processor 80 batch reports the measurements rather than reports the measurements individually. The processor 80 may be configured to send the measurements in one or more messages, with the messages including a unique identifier (ID) of the measurement device 70. The processor 80 may be configured to receive one or more locations (indications of location) of the measurement device 70 from the server 30, e.g., calculated by the server 30 based on the measurements, and use the one or more locations as appropriate (e.g., in one or more location-based applications).

The processor 80 may be configured to determine location of the measurement device 70 and send this location to the server 30 and/or to other measurement devices 12-17. For example, the processor 80 may be configured to determine a location (e.g., a global location) by trilateration and provide this location to the server 30 and/or to other measurement devices 12-17. The other measurement devices 12-17 may use this location, and a relative location of the other measurement device 12-17 to the measurement device 70, and/or to one or more of the other measurement devices 12-17, to determine the location (e.g., global location) of the other measurement device 12-17.

The sensor(s) 100 may be used in relative location measurements, relative location determination, motion determination, etc. Information detected by the sensor(s) 100 may be used for motion detection, relative displacement, dead reckoning, sensor-based location determination, and/or sensor-assisted location determination. The sensor(s) 100 may be useful to determine whether the measurement device 70 is fixed (stationary) or mobile and/or whether to report certain useful information to the server 30 regarding the mobility of the measurement device 70. For example, based on the information obtained/measured by the sensor(s), the measurement device 70 may notify/report to the server 30 that the measurement device 70 has detected movements or that the measurement device 70 has moved, and report the relative displacement/distance (e.g., via dead reckoning, or sensor-based location determination, or sensor-assisted location determination enabled by the sensor(s) 100). In another example, for relative positioning information, the sensors/IMU can be used to determine the angle and/or orientation of the other device with respect to the measurement device, etc.

The IMU 102 may be configured to provide measurements about a direction of motion and/or a speed of motion of the measurement device 70, which may be used in relative location determination. For example, the IMU 102 may include one or more accelerometers 106 and/or one or more gyroscopes 108 to detect, respectively, a linear acceleration and a speed of rotation of the measurement device 70. The linear acceleration and speed of rotation measurements of the measurement device 70 may be integrated over time to determine an instantaneous direction of motion as well as a displacement of the measurement device 70. The instantaneous direction of motion and the displacement may be integrated to track a location of the measurement device 70. For example, a reference location of the measurement device 70 may be determined, e.g., using the SPS receiver 86 (and/or by some other means) for a moment in time and measurements from the accelerometer(s) 106 and gyroscope(s) 108 taken after this moment in time may be used in dead reckoning to determine present location of the measurement device 70 based on movement (direction and distance) of the measurement device 70 relative to the reference location.

The magnetometer 104 may determine magnetic field strengths in different directions which may be used to determine orientation of the measurement device 70. For example, the orientation may be used to provide a digital compass for the measurement device 70. The magnetometer 104 may be a two-dimensional magnetometer configured to detect and provide indications of magnetic field strength in two orthogonal dimensions. Alternatively, the magnetometer 104 may be a three-dimensional magnetometer configured to detect and provide indications of magnetic field strength in three orthogonal dimensions. The magnetometer 104 may provide means for sensing a magnetic field and providing indications of the magnetic field, e.g., to the processor 80.

The processor 80, e.g., in combination with the software 84 and possibly in combination with the magnetometer 104, may provide means for analyzing indications of magnetic field to determine the orientation of the measurement device 70.

Figure 3:
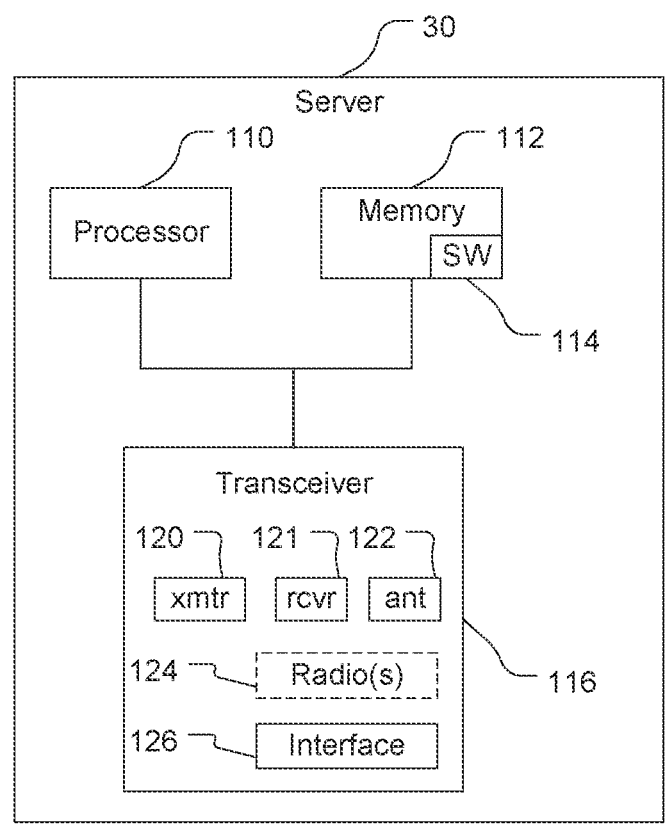
FIG. 3 is a simplified block diagram of a server of the position determination system shown in FIG. 1.

Referring to FIG. 3, with further reference to FIGS. 1 and 2, an example of the server 30 comprises a computer system including a processor 110, a memory 112 including software (SW) 114, and a transceiver 116. The processor 110 may be an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 110 may comprise multiple separate physical entities that can be distributed in the server 30. Although referred to in the singular, the processor 110 may comprise one or more processors. The memory 112 may include random access memory (RAM) and/or read-only memory (ROM). The memory 112 is a non-transitory, processor-readable storage medium that stores the software 114 which is processor-readable, processor-executable software code containing instructions that are configured to, when performed, cause the processor 110 to perform various functions described herein. The description may refer only to the processor 110 or the server 30 performing the functions, but this includes other implementations such as where the processor 110 executes software and/or firmware. The software 114 may not be directly executable by the processor 80 and instead may be configured to, for example when compiled and executed, cause the processor 80 to perform the functions. Whether needing compiling or not, the software 84 contains the instructions to cause the processor 110 to perform the functions. The processor 110 is communicatively coupled to the memory 112. The processor 110 in combination with the memory 112, and/or the transceiver 116 may provide means for performing functions as described herein, for example, means for determining measurement times, means for determining a subset of positioning signal sources, means for sending measurement commands, means for receiving measurement data, means for determining location, and/or means for sending location information. The software 114 can be loaded onto the memory 82 by being downloaded via a network connection, uploaded from a disk, etc.

The transceiver 116 includes a transmitter 120, a receiver 121, and an antenna 122. While the transmitter 120, the receiver 121, and the antenna 122 are each referred to in the singular, the transmitter 120 may include multiple transmitters, the receiver 121 may include multiple receivers, and/or the antenna 122 may include multiple antennas. The antenna 122 may be configured to transduce electrical signals and/or optical signals to wireless signals and to transduce wireless signals to electrical signals and/or optical signals. The transmitter 120 may include one or more appropriate antennas of the antenna 122 and the receiver 121 may include one or more appropriate antennas of the antenna 122.

The transceiver 116 may be configured to send communications via wire or wirelessly from the server 30 and to receive wired or wireless communications into the server 30, e.g., from the measurement devices 12-17, the access points 24, 25, and/or the base station 26 directly and/or via the network 28. The transceiver 116 may include an interface 126 for transmitting and receiving wired communications, e.g., to and from the network 28, and may include one or more wireless communication radios 124. For example, the radio(s) 124 may include a BLUETOOTH® radio, a Wi-Fi radio, one or more cellular radios (e.g., a long-term evolution (LTE) radio, a 5G New Radio (NR) radio, etc.), a WWAN radio, etc. As shown, the radio(s) 124 are optional. One or more other types of radios may be included in the server 30 in addition to, or instead of, the radio(s) 124. The radio(s) 124 and/or other radio(s) included in the transceiver 116 include appropriate portions of the transmitter 120, the receiver 121, and the antenna 122. If the transceiver 116 includes more than one wireless communication radio, then the transceiver 116 may receive a wireless communication using one of the wireless communication radios, and transmit (e.g., relay or forward), the communication (or a portion thereof) using a different wireless communication radio.

Figure 4:
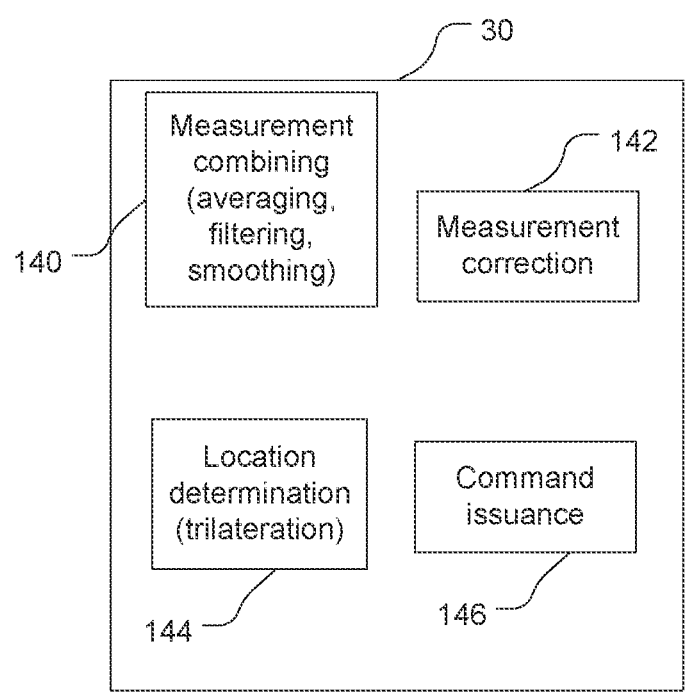
FIG. 4 is a functional block diagram of the server shown in FIG. 3.

Referring also to FIG. 4, the server 30 may be configured to implement several functional blocks, here including measurement combining 140, measurement correction 142, location determination 144, and command issuance 146. The functional blocks may be implemented by appropriate portions of the server 30, e.g., the processor 110 and the memory 112 for the measurement combining 140, measurement correction 142, and the location determination 144, and the processor 110, the memory 112, and the transceiver 116 for the command issuance 146.

The processor 110 may be configured to determine the distance to an object as part of the location determination function 144 using known techniques (e.g., RSSI, RTT, etc.). The processor 110 may collect measurements from one or more of the measurement devices 12-17 and use the measurements to determine the location of one or more of the measurement devices 12-17, and thus a location of the device (e.g., the appliance 35, the light bulb 20, or the light bulb 22) associated with the corresponding measurement device 12-17. The processor 110 may apply one or more techniques for determining the location of a measurement device, and the processor 110 may be able to determine the location more accurately than the measurement device 12-17 could. The server may apply more precise position determination techniques (e.g., reverse RTK (Real-Time Kinematic)) and information, e.g., including ionospheric corrections, tropospheric corrections, differential corrections, line-of-sight/non-line-of-sight (LOS/NLOS) corrections, precise satellite orbit information, map matching (where map features such as sidewalks, streets, etc. are used to inform (e.g., confirm or discredit) location determinations), and/or more sophisticated algorithms than the measurement device could to determine the location of the measurement device. The processor 110 may be able to determine the location to a high enough degree of accuracy to be able to distinguish between measurement devices 12-17 (and consequently items associated with the measurement devices 12-17) that are located in close proximity to each other.

The processor 110 may combine multiple measurements in the measurement combining function 140 for use in (or even as part of an algorithm for) determining a location, which may help determine the location in a challenging environment (e.g., multipath environment, blockages between the measurement device 12-17 and the satellites 32-34 creating a non-line-of-sight situation, etc.). For example, the processor 110 may average/sample positioning signal measurements over time.

The processor 110 may determine ranges using multiple different techniques and/or measurements. The processor 110 may filter and/or smooth positioning signal measurements. The processor 110 may apply various corrections (that may be obtained by the processor 110 from one or more external sources) as part of the measurement correction function 142. For example, the processor 110 may apply differential correction to positioning signal measurements, may apply ionospheric and/or tropospheric corrections, may apply line-of-sight (LOS)/non-line-of-sight (NLOS) measurement corrections, and/or may apply Real-Time Kinematic (RTK) positioning to positioning signal measurements. The processor 110 may be configured to select which measurements to use based on an estimated distance to the measurement device 12-17 from a source of the positioning signal measured. As the server 30 is typically run from mains power, and not battery, power capacity may not be a limiting factor for location determination, e.g., more and/or one or more higher-complexity algorithms may be used by the server 30 than one of the measurement devices 12-17 to determine measurement device location.

The processor 110 may be configured to batch process positioning signal measurements to determine measurement device location as part of the location determination function 144. For example, the processor 110 may be configured to process multiple measurements that are batch reported by one or more of the measurement devices 12-17. As another example, the processor 110 may be configured to store multiple positioning signal measurements in the memory 112 and batch process the positioning signal measurements, which may reduce power consumption compared to processing each measurement as the measurement is received. For example, the processor 110 may store measurements until a threshold number of measurements are stored. The threshold number of measurements may be a quantity that is sufficient to (at least expected to) yield a threshold location accuracy, e.g., of 1 m (i.e., the determined location will be inside a 1 m-radius circle centered at the actual location of the measurement device). This threshold may vary, e.g., depending on quality of measurement data (which may depend on the environment in which the measurement device 12-17 is disposed). The threshold number of measurements may correspond to a number of measurements that may be efficiently processed by the processor 110. The threshold number may correspond to a desired time period of measurements, e.g., 24 hours of measurements from one of the measurement devices 12-17. Alternatively, the threshold number may have some other significance, or no particular significance.

The processor 110 may be configured to analyze measurement data, especially stored measurement data. For example, the processor 110 may determine whether to discard or discount (weight less) measurements based on the environment in which the measurements were obtained. As another example, the processor 110 may analyze stored measurement data to determine conditions under which the data were collected. The processor 110 may discard measurement data that were collected under poor conditions, e.g., during a time of high atmospheric interference. As another example, the processor 110 may determine satellite orbit information corresponding to when the measurement data were acquired. The orbit information may not be available in real time when measurements are taken. Thus, saving the data may allow the processor 110 to determine more accurate orbit information for the measurements, which may lead to more accurate location determination.

The processor 110 may control the measurement device 12-17 through the command issuance function 146 to reduce the amount of measurements taken. For example, the processor 110 may control the measurement device 12-17 to take intermittent measurements, e.g., to have intermittent measurement periods (time windows) instead of always being in a measurement mode. For example, the processor 110 may send BEGIN and END messages to a measurement device 12-17 to cause the measurement device to start and stop measuring positioning signals, respectively. As another example, the processor 110 may send a schedule of measurement windows for the measurement device 12-17 to follow, measuring positioning signals in the indicated measurement windows only. As another example, the processor 110 may send one or more messages to the measurement device 12-17 to indicate when to begin a series of measurement windows, durations of the measurements windows, and intervals between the measurement windows. The intervals may be consistent or varying. The processor 110 may change an intermittent measurement schedule by sending a command message that modifies or overrides one or more previous command messages that establishes the intermittent measurement schedule.

The processor 110 may send a command message, as part of the command issuance function 146, to the measurement device 12-17 to cause the measurement device 12-17 to measure positioning signals, or stop measuring positioning signals, in response to one or more criteria. For example, the processor 110 may detect that a need has arisen to know the location of the measurement device 12-17 (e.g., an indication being received that a device associated with the measurement device has been damaged and/or is to be repaired or replaced) and may send one or more commands to cause measurement of the positioning signals. The processor 110 may determine one or more desired times for positioning signal measurement based on one or more of a variety of factors. For example, the processor 110 may determine the desired measurement time(s) based on measurement estimated device position, constellation geometry, signal blockage (based on a map of the area including the estimated device position), solar activity (e.g., ionospheric effect), etc. The desired measurement times may include when and for how long to measure positioning signals, which may depend on various factors including the environment (e.g., LOS/NLOS, multipath) of the measurement device 12-17. The processor 110 may determine desired measurement times to be times of low solar activity and/or when there will be a direct LOS to a signal source. As another example, the processor 110 may determine a desired window for measuring one or more positioning signals, e.g., a window where good SPS signal quality is expected, e.g., based on satellite constellation geometry, SPS signal blockage (e.g., relative location(s) of the measurement device 12-17, the satellite(s), and interfering structure(s) (e.g., buildings, trees, etc.)), solar activity (e.g., ionospheric effect), and/or other relevant information, and send one or more commands to cause measurement of the positioning signals in one or more appropriate measurement windows. As another example, the processor 110 may send a command to the measurement device 12-17 to terminate measurement of the positioning signals in response to the processor 110 determining the location of the measurement device 12-17 with an acceptable accuracy.

The processor 110 may determine a subset of positioning signal sources (e.g., the satellites 32-34) from which positioning signals are to be measured and instruct the measurement device 12-17, as part of the command issuance function 146, to attempt to acquire and measure signals only from the subset of positioning signal sources. For example, the processor 110 may determine the subset of sources based on resources available at the measurement device 12-17 for tracking signal sources, i.e., based on how many signal sources the measurement device 12-17 can track. As another example, the processor 110 may determine an expected signal quality (e.g., received signal power) for each satellite based on an estimated location of the measurement device 12-17, a map of the environment of the estimated location, and a constellation map, and instruct the measurement device to attempt to acquire and measure only positioning signals expected to have at least a threshold signal quality (e.g., a threshold receive power). The estimated location may be determined in a variety of manners, e.g., based on visible base stations and/or access points, a previously-determined location, visibility of a picocell, etc. The processor 110 may consider whether signals from a signal source will be multi-path signals or directly-received signals in determining whether to include a signal source in the subset. For example, the processor 110 may exclude from the subset any positioning signal source that does not have an unobstructed line-of-sight to the measurement device 12-17.

The processor 110 can send assistance information to the measurement device 12-17 to help the measurement device 12-17 acquire the positioning signal from one or more positioning signal sources. The assistance information may comprise, for example, search windows for code phase and frequency, a current time, directions, and/or health information for respective satellites and/or indications of which satellites from which the measurement device 12-17 should or should not attempt to acquire positioning signals. For example, the processor 110 may use an encoded environment model to determine to which satellites the measurement device 12-17 has line of sight based on measurement device position and three-dimensional maps, and instruct the measurement device 12-17 to attempt to acquire and measure positioning signals from only the positioning signal sources (e.g., satellites 32-34) with line of sight to the measurement device 12-17. Also or alternatively, the processor 110 may send the encoded environmental model to the measurement device 12-17 and the measurement device 12-17 may determine from which positioning signal sources (e.g., which satellites 32-34) to acquire positioning signals. The assistance information can indicate a direction relative to the measurement device 12-17 to a positioning signal source, which may be used by the measurement device 12-17 to help the measurement device 12-17 find and acquire positioning signals. The measurement device 12-17 may be directed to a smaller search space for acquiring a positioning signal. The assistance information may also or alternatively narrow a time window for searching for a positioning signal, which may reduce time and power to acquire the signal. The assistance information can be saved by the measurement device 12-17 and used by the measurement device 12-17 at start-up to help acquire one or more SPS signals.

The processor 110 may issue one or more measurement commands to cause the measurement device 12-17 to perform a combination of two or more functions discussed above. For example, the processor 110 may send one or more measurement commands to a measurement device 12-17 to cause the measurement device 12-17 to measure positioning signals of a subset of available positioning signal sources, and to do so intermittently.

Operation

Figure 5:
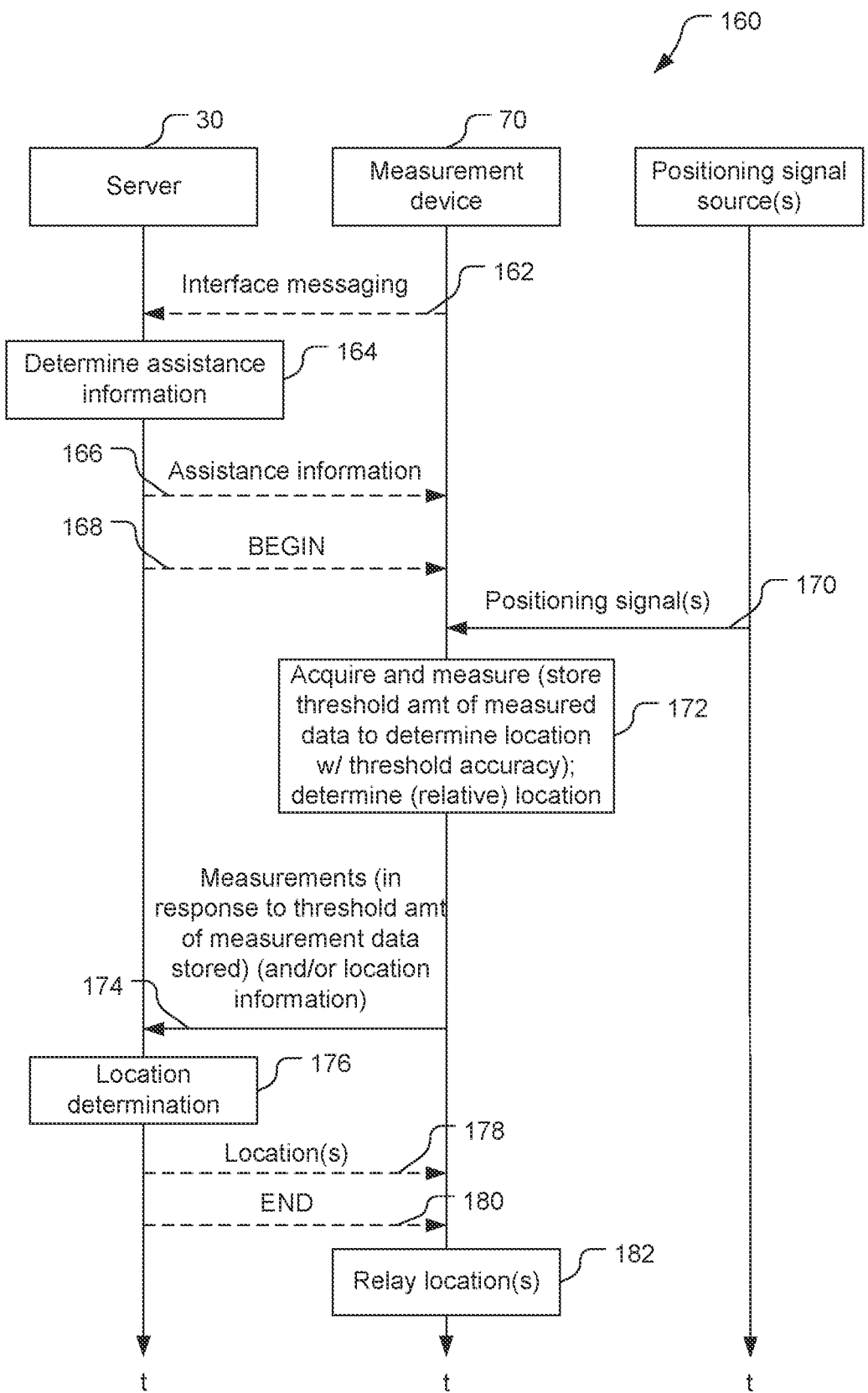
FIG. 5 is a signal flow diagram for signals exchanged between the positioning signal measurement device, the server, and satellite vehicles shown in FIG. 1.

Referring to FIG. 5, with further reference to FIGS. 1-3, an example flow diagram 160 includes operations of, and signal exchanges between, the server 30, the measurement device 70, and one or more positioning signal sources 161. The positioning signal source(s) 161 may include one or more of the satellites 32-34, and/or the access points 24, 25, and/or the base station 26, and/or one or more other measurement devices 12-17, and/or may include one or more other devices (e.g., satellites, access points, base stations, measurement devices, etc.). The vertical lines depict the passage of time (t). The order of operations and signal exchanges (here, stages) shown in FIG. 5 is an example, and other orders may be used, and one or more operations and/or signal exchanges may be added or removed. Stages, such as stages 166, 168, may be combined. Stages shown in dashed lines are optional and may be omitted. Also, communications may be direct or indirect, e.g., a communication from the server 30 to the measurement device 70 may be passed through one or more intermediary devices such as another measurement device, the network 28, a base station (e.g., a cellular base station, an access point), etc.

Interface messaging information may be provided at stage 162 from the measurement device 70 to the server 30. This information may include an estimated position of the measurement device 70, a location identity and/or estimated device position information, a measurement device identity, SPS time and/or UTC time (Coordinated Universal Time), an SPS measurement block (e.g., positioning signal measurements), customer data, etc. The estimated device position information may comprise a location itself and/or information from which an estimated position may be determined. For example, the estimated device position information may comprise a neighbor list of visible base stations, and/or an identity of a nearest base station (e.g., identity of a base station corresponding to a signal with a highest received signal strength), and/or an identity of a visible picocell base station, etc.

The server 30 may determine assistance information at stage 164. The server 30 may determine the assistance information based on the estimated location information, e.g., based on the estimated location of the measurement device 70 and an environment of the location (e.g., satellite constellation, one or more objects between the measurement device 70 and one or more satellites, etc.). The assistance information may comprise indications of when to acquire and measure positioning signals, and the server 30 may determine this information in a variety of manners, including retrieving the information from the memory 82 (e.g., retrieving measurement windows, retrieving measurement durations and an interval between measurements, etc.). The assistance information may indicate from which positioning signal source(s) 161 to attempt to acquire positioning signals, e.g., may indicate a subset of the positioning signal sources 161, such as the satellites 32-34, the access points 24, 25, the base station 26, and the measurement devices 12-17 (and/or other devices) from which to attempt to acquire positioning signals and/or from which positioning signal source(s) 161 not to attempt to acquire positioning signals. For example, the assistance information may indicate which pseudorandom codes to attempt to correlate to incoming SPS signals and/or which pseudorandom codes not to attempt to correlate to incoming SPS signals.

The server 30 may provide the assistance information to the measurement device 70 at stage 166. The assistance information may help the measurement device 70 to acquire one or more positioning signals, and/or may cause the measurement device 70 to attempt to acquire and measure one or more positioning signals at particular times (e.g., scheduled times, at scheduled intervals, etc.).

The server 30 may provide a specific BEGIN command at stage 168 to begin acquiring and/or measuring one or more positioning signals. The BEGIN command may be provided as part of the assistance information at stage 166.

At stage 170, one or more positioning signals (e.g., one or more SPS signals and/or one or more communication signals) are received by the measurement device 70 from one or more of the positioning signal sources 161. The positioning signals may be received at other times (e.g., any time that a particular satellite is in view), but is shown here at a specific time for illustrative purposes.

At stage 172, the measurement device 70 may attempt to acquire, acquire, and measure the one or more received positioning signals. The measurement device 70 may measure positioning signals from corresponding positioning signal sources 161 indicated by the assistance information and/or during time periods dictated by the assistance information. Alternatively, if the server 30 has not commanded particular positioning signal sources and/or particular times to measure positioning signals, then the measurement device 70 may attempt to measure positioning signals from all the positioning signal sources 161 from which the measurement device(s) is configured to acquire positioning signals, or may determine a subset of the positioning signal sources 161 from which to measure positioning signals, and/or may measure positioning signals intermittently, e.g., according to a schedule determined by the measurement device 70 (e.g., read from the memory 82 by the processor 80). The schedule may be specific times, or times determined by a start time, measurement duration, interval between measurements. For example, the measurement device 70 may measure (in accordance with instructions from the server 30 or from internal instructions) positioning signals for five minutes each hour (i.e., with an interval of 55 minutes between measurement periods). The interval may be constant or varying (e.g., based on time of day, satellite positions, etc.).

At stage 172, the measurement device 70 may determine relative location. For example, the processor 80 may determine one or more ranges from the measurement device 70 to one or more other ones of the measurement devices 12-17. For example, the measurement device 15 may determine locations of the measurement devices 16, 17 relative to the measurement device 15. The processor 80 may determine a location (e.g., a global location) of the measurement device 70 if the processor 80 is configured to do so.

At stage 174, the measurement device 70 may send the measurements to the server 30. The measurement device 70 may compile the measurements and batch report the measurements. The measurements may include pseudoranges (and/or signal arrival timing), and/or Doppler shift information, and/or carrier phase, and/or RSSI, etc. For example, the measurement device 70 may batch report measurements taken over the previous 24 hours or another amount of time. Alternatively, the measurement device 70 may batch report specific quantities, e.g., specific numbers of measurements or specific amounts of data of the measurements. For example, the measurement device 70 may batch report enough measurements that the server 30 will be able to determine the location of the measurement device 70 within a threshold distance, e.g., one meter (1 m).

At stage 174, the measurement device 70 may send the location information, if determined by the measurement device 70, to the server 30. The measurement device 70 may send relative location and/or another location (e.g., global location) to the server 30. For example, the measurement device 70 may send relative location (e.g., range and possibly direction) from the measurement device 70 to one or more other devices (e.g., one or more other measurement devices 12-17). This information may be reported so that the server 30 may determine a location, e.g., a global location, of another device based on a determined location (e.g., global location) of the measurement device 70, and a relative location of the measurement device 70 and the other device. Further, one or more of the measurements and/or the location information may be sent to the server 30 indirectly (e.g., via one or more intermediate devices) from the measurement device 70.

At stage 176, the server 30 may perform location determination. The server 30 may batch process measurement information from the measurement device 70, may apply one or more corrections, may filter, average, and/or smooth the measurements, and may apply an appropriate location technique to determine the location of the measurement device 70. The server 30 may use measurements from more than one measurement device to determine the location of the measurement device 70. For example, if the location of another measurement device is known, then the range from the measurement device 70 to the other measurement device may be used as part of a trilateration calculation. As another example to improve the device 70 positioning, if the distance between device 70 and another device is short, e.g. less than 1 km, then the measurement errors in both devices are highly correlated, and the range error computed on the other device can be used to correct the range measurements on the device 70. The technique(s) used by the server 30 to determine the location may use more resources (e.g., power, processing capacity) than are available at the measurement device 70 to determine location such that the location may be determined more accurately than could be determined by any of the measurement devices 12-17. For example, a more complex algorithm or calculation may be able to be performed by the server 30 than could be performed, or would be desired to be performed, by the measurement device 70.

The location determination at stage 176 may include determining a location of one or more devices other than the measurement device 70. The server 30 may determine a location of another device based on the determined location of the measurement device 70, and a relative location of the other device to the measurement device 70. The relative location may be determined by the other device, the measurement device 70, or the server 30.

At stage 178, the server 30 may report the determined location(s) to the measurement device 70. The measurement device 70 may desire the location for one or more of a variety of reasons. For example, the measurement device 70 may use a global location of the measurement device 70 as part of a location-based application to provide information to a user. As another example, the measurement device 70 may provide the location to a user as part of a notice. For example, the measurement device 14 may report the location of the measurement device 14 as part of a notice that the corresponding light bulb 22 is in need of repair or replacement. The location, an in particular the location to a high degree of accuracy (e.g., 1 m), may be useful in guiding a repair person to the bulb 22, and/or indicating a particular part to be repaired/replaced (e.g., if the part is location dependent (e.g., if a port side part is different from a starboard side part)). The location may be determined accurately enough to distinguish which item to repair from among multiple items in close proximity. The location(s) sent to the measurement device 70 may include the location (s) of one or more devices other than the measurement device 70, such as one or more other devices whose relative location is/are known (e.g., has/have been determined) by the server 30 relative to the measurement device 70. For example, locations of nearby/neighboring devices may be provided, such as locations of the measurement devices 16, 17 being provided to the measurement device 15.

At stage 180, the server 30 sends and END command to the measurement device 70 to cause the measurement device 70 to stop measuring the positioning signals. Here, the server 30 sends the END command after the location has been determined. The END command may be sent in response to one or more criteria such as the location having been determined within a threshold accuracy. Further measurements can be instructed after the END command (e.g., to determine whether the measurement device 70 has moved, in response to which fresh measurements may be instructed). Measurements obtained while the measurement device 70 is moving may be discarded. In other examples, the server 30 may send the BEGIN and END commands to the measurement device 70 to define each measurement window. For example, a BEGIN command may be sent, followed by an END command a few minutes later, and this process repeated intermittently, e.g., periodically such as once an hour. Measurements from the measurement windows may be reported for each window, batch reported for the window, batch reported for multiple windows, etc.

At stage 182, the location(s) sent by the server 30 at stage 178 may be relayed by the measurement device 70 to one or more other devices, such as one or more of the other measurement devices 12-17. For example, if the measurement device 70 is the measurement device 15, then the measurement device 15 may relay the location of the measurement device 15 to measurement devices near the measurement device 15, here the measurement devices 16, 17 neighboring the measurement device 15 as shown in FIG. 1. The location of the measurement device 70 may be relayed and the one or more other devices may use this location to determine its/their location(s) based on relative location(s) to the measurement device 70. If the server 30 sent the location(s) of one or more other devices, then the measurement device 70 may relay the location(s) appropriately.

Figure 6:
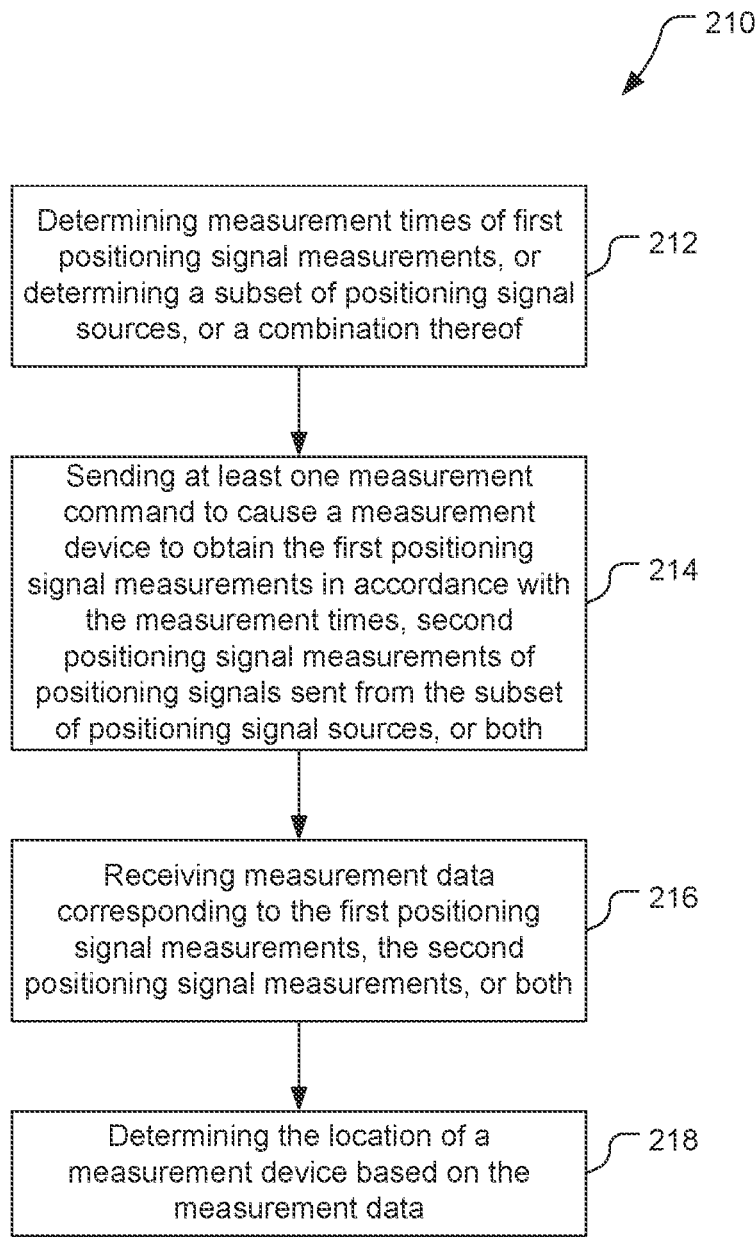
FIG. 6 is a block flow diagram of a method of determining a location of a measurement device.

Referring to FIG. 6, with further reference to FIGS. 1-5, a method 210 of determining a location of a measurement device includes the stages shown. The method 210 is, however, an example only and not limiting. The method 210 can be altered, e.g., by having stages added, removed, rearranged, combined, performed concurrently, and/or having single stages split into multiple stages.

At stage 212, the method 210 includes determining measurement times of first positioning signal measurements, or determining a subset of positioning signal sources, or a combination thereof. For example, the server 30 may determine measurement times of first positioning signal measurements (to be obtained, e.g., made, by the measurement device) of first positioning signals from a first plurality of positioning signal sources. Also or alternatively, the server 30 may determine a subset of positioning signal sources, of a second plurality of positioning signal sources, from which second positioning signal measurements are to be obtained (e.g., made, e.g., by the measurement device) of second positioning signals. The subset comprises fewer positioning signal sources than the second plurality of positioning signal sources. The server 30 may determine the subset based on a location of the measurement device 70, e.g., as provided to the server 30 in stage 162 shown in FIG. 5. The measurement times and/or the subset of positioning signal sources may comprise assistance data to be provided to a measurement device. The processor 110 of the server 30, in combination with the memory 112 (including the software 114), may comprise means for determining the measurement times and/or the subset of positioning signal sources.

Determining the subset of positioning signal sources may comprise determining the positioning signal sources of the second plurality of positioning signal sources from which high-quality positioning signals will be received at the measurement device. For example, the server 30 may use an estimated location of the measurement device 70, knowledge of positions of the positioning signal sources such as the satellites 32-34, and/or knowledge of an environment (e.g., location and size of buildings, terrain features, etc.) of the estimated location to determine which positioning signals may arrive at the measurement device 70 directly or via multi-path. The server 30 may choose the sources from which signals will arrive directly to be in the subset and/or choose the sources from which signals will not arrive directly not to be in the subset.

The determined measurement times may take a variety of forms. For example, the measurement times may be specific future times, e.g., day and time of day, or may be a measurement duration and a measurement periodicity (e.g., a five-minute measurement time with measurements beginning every 60 minutes, or with an interval between measurements of 55 minutes). These measurement times are examples, and other forms of measurement times, and/or other measurement durations and/or measurement periodicities may be used. The determining at stage 212 may include calculation by the processor 110 and/or retrieval from the memory 112 of information from which the measurement times may be calculated or retrieval from the memory 112 of the measurement times or the measurement duration(s) and periodicity(ies) themselves.

At stage 214, the method 210 includes sending at least one measurement command to cause a measurement device to obtain the first positioning signal measurements in accordance with the measurement times, the second positioning signal measurements, or both. For example, the server 30, e.g., the processor 110 in combination with the transceiver 116 (providing a means for sending at least one measurement command), may send one or more measurement commands to the measurement device 70 to instruct the measurement device to obtain the first positioning signal measurements (that are made at the measurement times), or to obtain the second positioning signal measurements from the subset of positioning signal sources, or a combination of these.

At stage 216, the method 210 includes receiving measurement data corresponding to the first positioning signal measurements, the second positioning signal measurements, or both. For example, stage 216 may include receiving measurement data corresponding to the first or second positioning signal measurements, or a combination thereof, at the server 30, e.g., from the measurement device 70 (and/or from another device). The measurement data may include indications of the measurements themselves, and/or information derived from the measurements, e.g., one or more ranges from the measurement device 70 to one or more corresponding positioning signal sources. The processor 110 in combination with the transceiver 116 may comprise means for receiving the measurement data.

At stage 218, the method 210 includes determining the location of the measurement device based on the measurement data. For example, the server 30 may determine the location of the measurement device 70 by trilateration using ranges, and/or using the measurements to determine ranges, between the measurement device 70 and signal sources and known locations of the signal sources. The processor 110 and the memory 112 may comprise means for determining the location. Also or alternatively, the measurement device 70 could determine the location at stage 218 and provide the location to the server 30 at stage 216 as part of the measurement data, with the processor 80 and the memory 82 comprising means for determining the location.

The method 210 may further include one or more other features. For example, the method 210 may further include determining that the location of the measurement device has been determined within a threshold level of accuracy, and in response thereto, sending a termination command to the measurement device to cause the measurement device to stop obtaining the first positioning signal measurements, or the second positioning signal measurements, or a combination thereof. The command to stop obtaining the positioning signal measurements may be a command to stop indefinitely, or a command to stop non-permanently (e.g., with a defined time to restart, e.g., specifying an amount of time to stop (i.e., an amount of time to let pass before obtaining, e.g., measuring, again)). If the command is to stop indefinitely, another command may be issued later to cause measurements to be obtained again. The processor 110 and the memory 112 may comprise means for determining that the location of the measurement device has been determined within a threshold level of accuracy, and the processor 110, the memory 112, and the transceiver 116 may comprise the means for sending the termination command.

Also or alternatively, the method 210 may include storing the measurement data, where determining the location of the measurement device comprises batch processing the measurement data corresponding to multiple ones of the first positioning signal measurements, or multiple ones of the second positioning signal measurements, or a combination of at least one of the first positioning signal measurements and at least one of the second positioning signal measurements. For example, the server 30 may store measurement data received from multiple communications from the measurement device 70 before processing the measurement data. Batch processing at the server 30 may be more efficient, e.g., from a power consumption perspective. If the measurement data are stored at the measurement device 70 and batch reported, this may be more efficient from power consumption and wireless traffic (e.g., less noise, fewer collisions, etc.) perspectives. The batch processing may be performed in response to determining that a threshold amount of the measurement data has been stored. For example, the processor 110 may determine that a threshold number of measurements (or ranges) corresponding to a threshold number of different positioning signal sources have been received before processing the measurement data. The threshold amount of the measurement data may be an amount sufficient for the server to determine the location of the measurement device within a threshold level of accuracy, e.g., a threshold distance such as 1 meter. The processor 110 and the memory 112 may comprise means for storing the measurement data and means for batch processing the measurement data.

Also or alternatively, the method 210 may include averaging the measurement data to produce averaged measurement data, where determining the location of the measurement device based on the measurement data comprises determining the location of the measurement device using the averaged measurement data. The processor 110 and the memory 112 may comprise means for averaging the measurement data. Also or alternatively, the measurement device 70, e.g., a signal receiver and/or the processor 80 may comprise means for averaging the measurement data.

Also or alternatively, the method 210 may include determining a location of another device based on the location of the measurement device and a relative location of the other device to the measurement device. The method 210 may include receiving relative location information regarding the relative location of the measurement device and the other device, and determining the relative location of the other device to the measurement device from the relative location information. For example, the measurement device 70 may provide measurement of a signal from another measurement device and the server 30 may determine the relative location of the other device and the measurement device 70. Using this information, and the determined location of the measurement device 70, the server may determine the location of the other device. Alternatively, the measurement device 70 may determine the relative location of the other device and send the relative location as the relative location information to the server 30. The server 30 would receive the relative location information and determine the relative location by reading/analyzing the relative location information. The processor 110, the memory 112, and the transceiver 116 may comprise means for receiving the relative location information, and the processor 110 and the memory 112 may comprise means for determining the relative location and determining the location of the other device.

Figure 7:
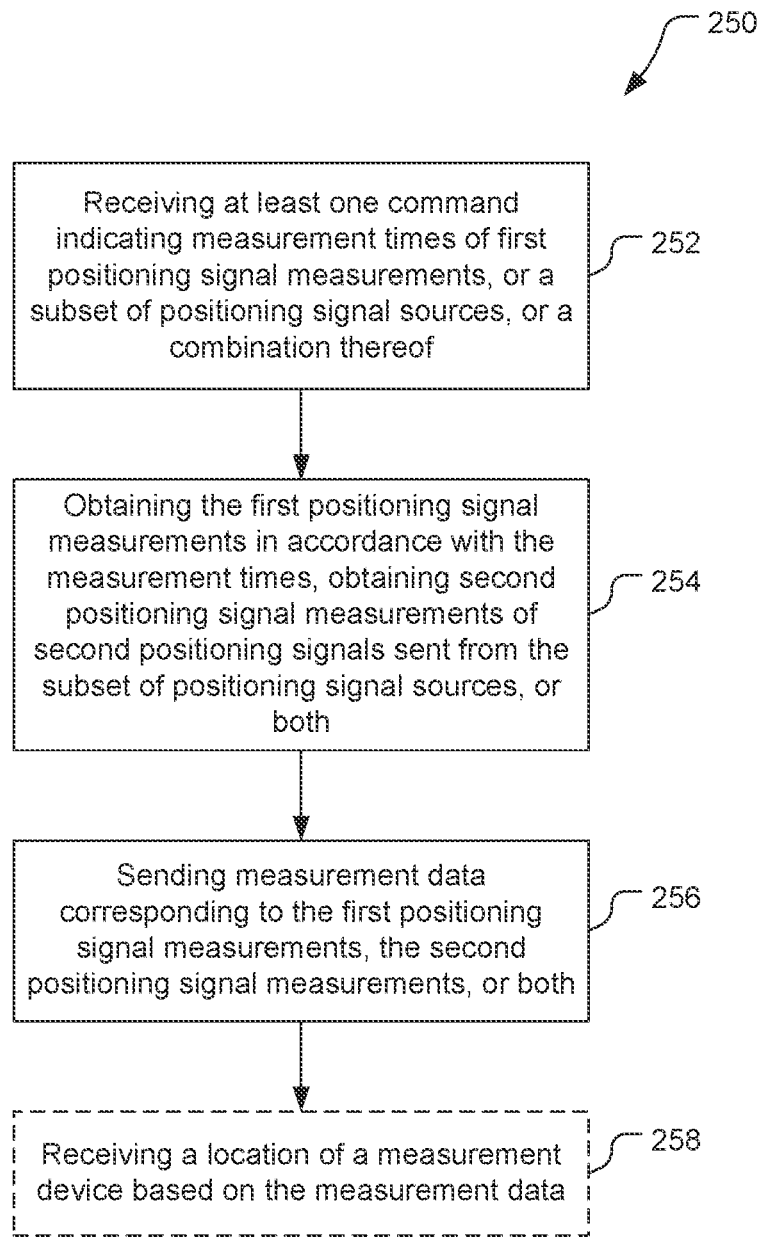
FIG. 7 is a block flow diagram of a method of obtaining a location of a measurement device.

Referring to FIG. 7, with further reference to FIGS. 1-6, a method 250 of obtaining and providing positioning signal measurement data, and possibly obtaining a location of a measurement device, includes the stages shown. The method 250 is, however, an example only and not limiting. The method 250 can be altered, e.g., by having stages added, removed, rearranged, combined, performed concurrently, and/or having single stages split into multiple stages. For example, stage 258 may be omitted.

At stage 252, the method 250 includes receiving at least one command indicating measurement times of first positioning signal measurements, or a subset of positioning signal sources, or a combination thereof. For example, the at least one measurement command may be received from the server 30 at the measurement device 70. The processor 80 and the transceiver 88 may comprise means for receiving the at least one measurement command. The first positioning signal measurements may be measurements of first positioning signals from a first plurality of positioning signal sources, e.g., to be made by the measurement device 70. A "measurement device" as used herein may comprise multiple devices. Each of the devices may measure at least some of the first positioning signals and at least one of the measurement devices may obtain, e.g., collect, the measurements (i.e., indications of the measurements) from one or more of the other devices, e.g., by communicating with the other device(s). Alternatively, a measurement device may not measure any of the first positioning signals, but may obtain, e.g., collect, the measurements from one or more other devices. The subset of positioning signal sources may be of a second plurality of positioning signal sources from which second positioning signal measurements are to be made of second positioning signals. The subset may comprise fewer positioning signal sources than the second plurality of positioning signal sources.

At stage 254, the method 250 includes making the first positioning signal measurements in accordance with the measurement times, making the second positioning signal measurements, or both. For example, the measurement device 70 (e.g., the SPS receiver 86, and/or one or more of the radio(s) 94, and/or one or more other sensors) may measure positioning signals at the measurement times or receive measurements, made at the measurement times, from one or more other devices, or may measure (or receive measurements of) positioning signals sent from the subset of the positioning signal sources, or a combination thereof (e.g., measure positioning signals from the subset of the positioning signal sources at specified measurement times). The processor 80 and the SPS receiver 86 and/or the transceiver 88 (e.g., one or more of the radio(s) 94 and/or one or more other receivers or sensors) may comprise means for making the positioning signal measurements.

At stage 256, the method 250 includes sending measurement data corresponding to the first positioning signal measurements, the second positioning signal measurements, or both. For example, the measurement device 70 (e.g., the processor 80 and the transceiver 88) may send the measurement data from the measurement device 70 to the server 30 (and/or to another server). The measurement data may be one or more measurements of positioning signals from one or more corresponding positioning signal sources, or information derived therefrom, e.g., averaged measurements, calculated range from the measurement device 70 to the signal source, etc. The processor 80 and the transceiver 88 may comprise means for sending the measurement data.

At stage 258, the method 250 includes receiving a location of a measurement device based on the measurement data. For example, the measurement device 70 (e.g., the transceiver 88 and the processor 80) may receive the location from the server to which the measurement data were sent, e.g., the server 30. The processor 80 and the transceiver 88 may comprise means for receiving the location. The measurement device 70 may use the location, e.g., for a location-based application, or may provide the location along with other information, e.g., along with an indication of a needed repair to assist a recipient of the indication with the repair. Alternatively, the server 30 may use the location of the measurement device 70 for these or other purposes, and may not send (and thus the measurement device 70 may not receive) the location to the measurement device 70.

The method 250 may further include one or more other features. For example, the method 250 may further include making a third positioning signal measurement, at the measurement device, of a third positioning signal from another measurement device, determining relative location information regarding a relative location of the measurement device and the other measurement device based on the third positioning signal measurement, and sending the relative location information to the server from the measurement device. For example, the measurement device 70 (e.g., the measurement device 15) may measure a positioning signal from another device such as the measurement device 16, determine a relative location of the measurement device 16 (e.g., a range, and possibly direction, from the device 15 to the device 16), and report the relative location to the server 30. The server 30 may use the relative location information and the location of the measurement device 70 to determine the location of the other device, e.g., the location of the measurement device 16. The processor 80 and the transceiver 88 may comprise means for making the third positioning signal measurement, means for determining the relative location information, and means for sending the relative location information.

Also or alternatively, the method 250 may include storing a threshold amount of the measurement data at the measurement device, where sending the measurement data is performed in response to the threshold amount of measurement data being stored at the measurement device. For example, the processor 80 may store multiple measurements in the memory 82 and batch report the measurements by sending the measurements to the server 30 once the threshold amount of measurement data has been stored. The processor 80 and the memory 82 may comprise means for storing the measurement data and means for sending the measurement data in response to the threshold amount of measurement data being stored. The threshold amount of the measurement data may be an amount sufficient for the server 30 to determine the location of the measurement device 70 within a threshold level of accuracy, e.g., a threshold distance such as 1 meter.

Also or alternatively, the method 250 may include averaging the measurement data to produce averaged measurement data, where sending the measurement data from the measurement device to the server comprises sending the averaged measurement data. For example, the processor 80 may average the measurement data and send the averaged measurement data to the server 30 via the transceiver 88. The processor 80 and the memory 82 may comprise means for averaging the measurement data.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, an indication that a device is configured to perform a stated function means that the device contains appropriate equipment (e.g., circuitry, mechanical device(s), hardware, software (e.g., processor-readable instructions), firmware, etc.) to perform the stated function. That is, the device contains equipment that is capable of performing the stated function, e.g., with the device itself having been designed and made to perform the function, or having been manufactured such that the device includes equipment that was designed and made to perform the function. An indication that processor-readable instructions are configured to cause a processor to perform functions means that the processor-readable instructions contain instructions that when executed by a processor (after compiling as appropriate) will result in the functions being performed.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, a wireless communication device may communicate through one or more wired connections as well as through one or more wireless connections.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Also, configurations may be described as a method or process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform described tasks.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Components, functional or otherwise, shown in the figures and/or discussed herein as being connected or communicating with each other are communicatively coupled. That is, they may be directly or indirectly connected to enable communication between them.

What is claimed is:

1. A method of obtaining and providing positioning signal information, the method comprising:
   receiving, at a measurement device, at least one measurement command from a server;
   in response to the at least one measurement command, at the measurement device, obtaining measurement data by:
      determining one or more measurement windows;
      determining a plurality of search windows, within at least one of the one or more measurement windows, for acquiring first positioning signals from first positioning signal sources; and
      obtaining first positioning signal measurements of only those first positioning signals, of the first positioning signals from the first positioning signal sources, that are received within at least one of the one or more measurement windows; and
   sending, from the measurement device to the server, measurement data corresponding to the first positioning signal measurements.

2. The method of claim 1, wherein the measurement device is a first measurement device, the method further comprising:
   obtaining a second positioning signal measurement, at the first measurement device, of a second positioning signal from a second measurement device;
   determining relative location information regarding a relative location of the first measurement device and the second measurement device based on the second positioning signal measurement; and
   sending the relative location information to the server from the measurement device.

3. The method of claim 1, further comprising averaging the measurement data to produce averaged measurement data, wherein sending the measurement data from the measurement device to the server comprises sending the averaged measurement data.

4. The method of claim 1, wherein the one or more measurement windows include at least one interval between at least one pair of consecutive measurement windows.

5. The method of claim 4, wherein the at least one interval between at least one pair of consecutive measurement windows includes different intervals between different pairs of consecutive measurement windows.

6. A measurement device comprising:
   a receiver configured to receive positioning signals;
   a transceiver; and
   a processor communicatively coupled to the receiver and the transceiver and configured to:
      receive, via the transceiver, at least one measurement command;
      respond to the at least one measurement command to use the receiver, in order to obtain measurement data, to:
         determine one or more measurement windows;
         determine a plurality of search windows, within at least one of the one or more measurement windows, for acquiring first positioning signals from first positioning signal sources; and
         obtain first positioning signal measurements of only those first positioning signals, of the first positioning signals from the first positioning signal sources, that are received within at least one of the one or more measurement windows times; and
      send, via the transceiver, measurement data corresponding to the first positioning signal measurements.

7. The measurement device of claim 6, wherein the measurement device is a first measurement device, and wherein the processor is further configured to:
   determine relative location information regarding a relative location of the first measurement device and a second measurement device from a second positioning signal measurement of a second positioning signal received from the second measurement device; and
   send, via the transceiver to a server, the relative location information.

8. The measurement device of claim 6, wherein the processor is further configured to average the measurement data to produce averaged measurement data, and wherein, to send the measurement data from the measurement device, the processor is configured to send the averaged measurement data.

9. The measurement device of claim 6, wherein the one or more measurement windows include at least one interval between at least one pair of consecutive measurement windows.

10. The measurement device of claim 9, wherein the at least one interval between at least one pair of consecutive measurement windows includes different intervals between different pairs of consecutive measurement windows.

* * * * *